Nov. 24, 1959  V. E. HOVELL  2,914,144
AUXILIARY SAFETY BRAKING SYSTEM
Filed Nov. 30, 1955  4 Sheets-Sheet 1
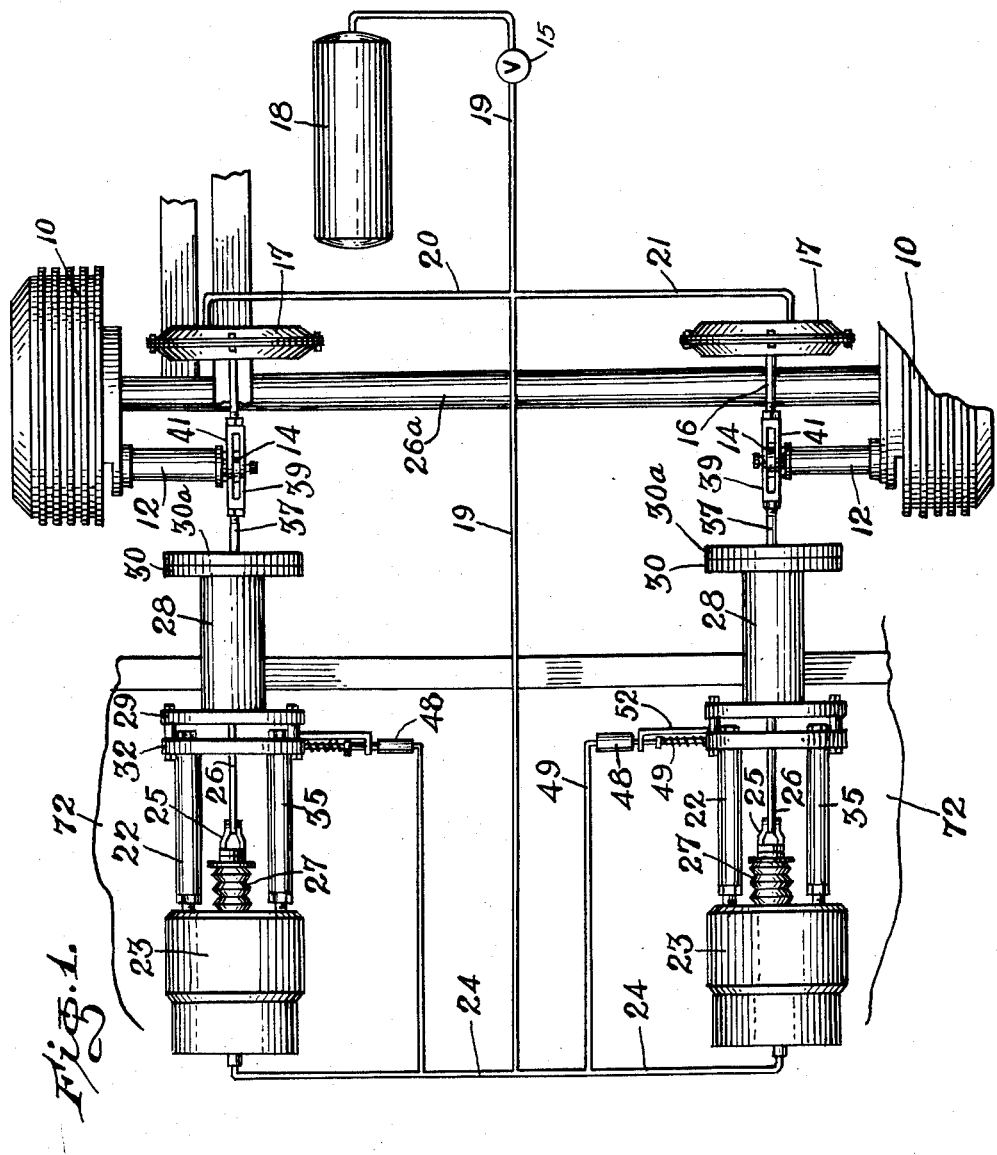
INVENTOR
*Victor E. Hovell*
BY *Charles L. Sturtevant*
ATTORNEY

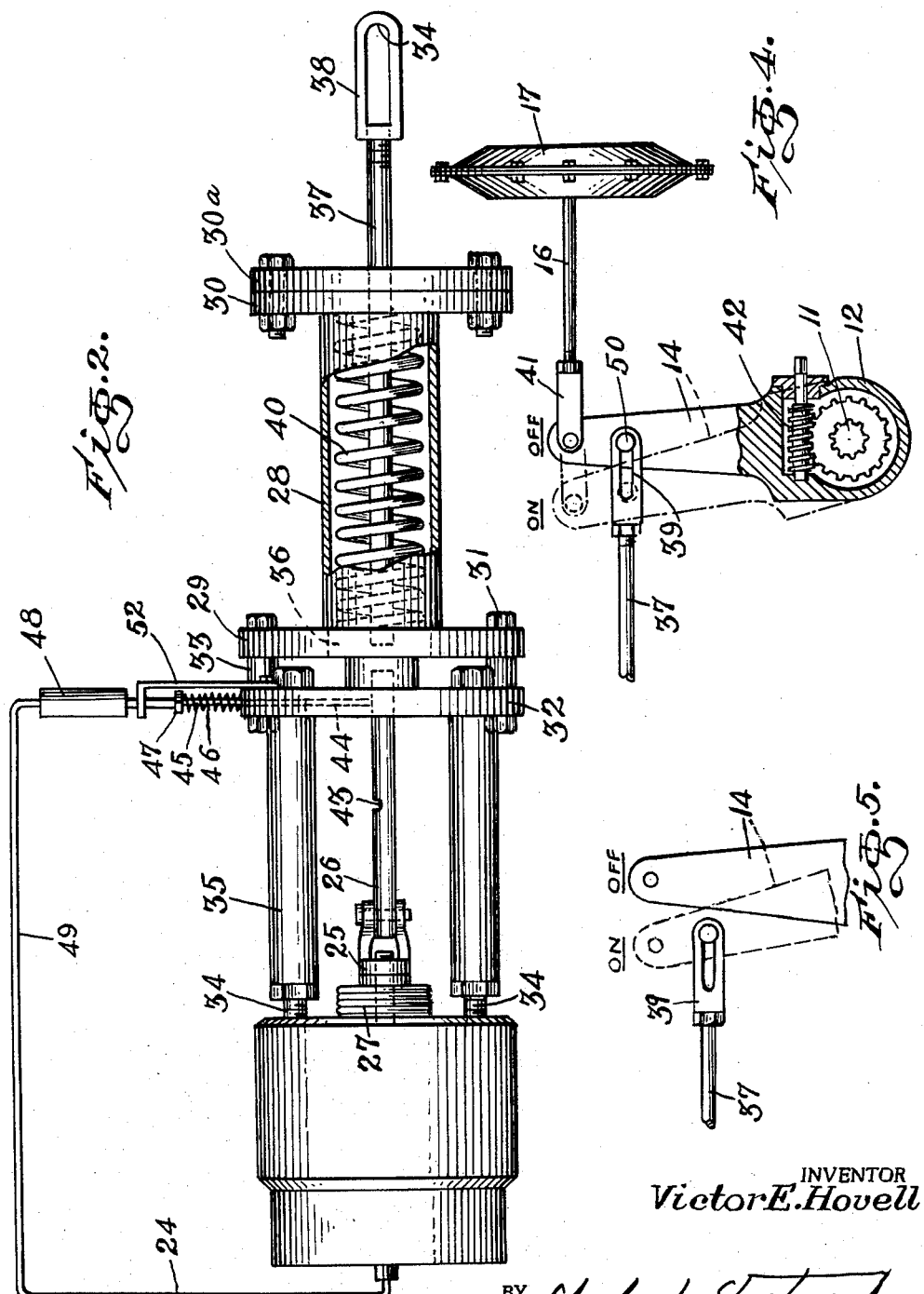

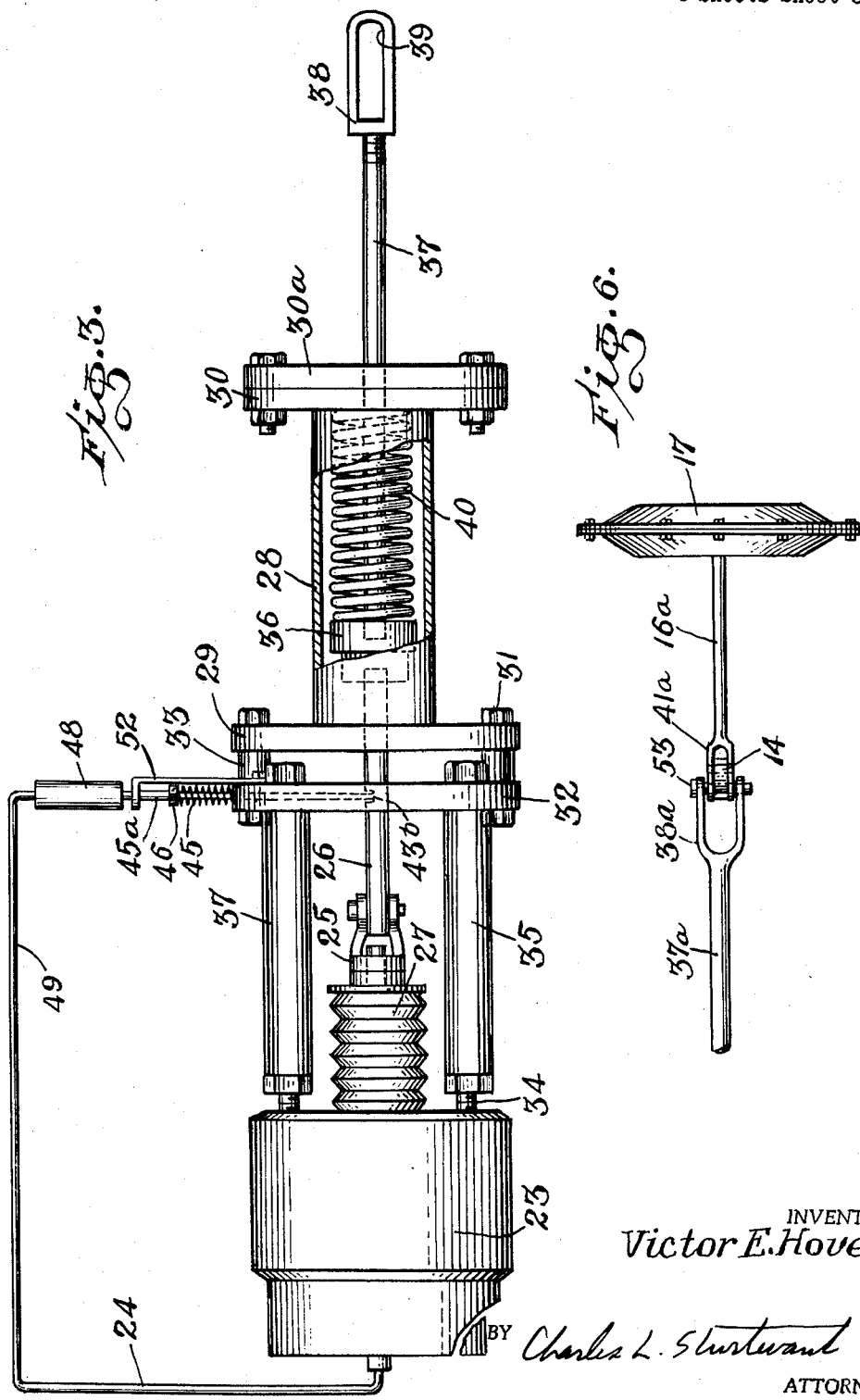

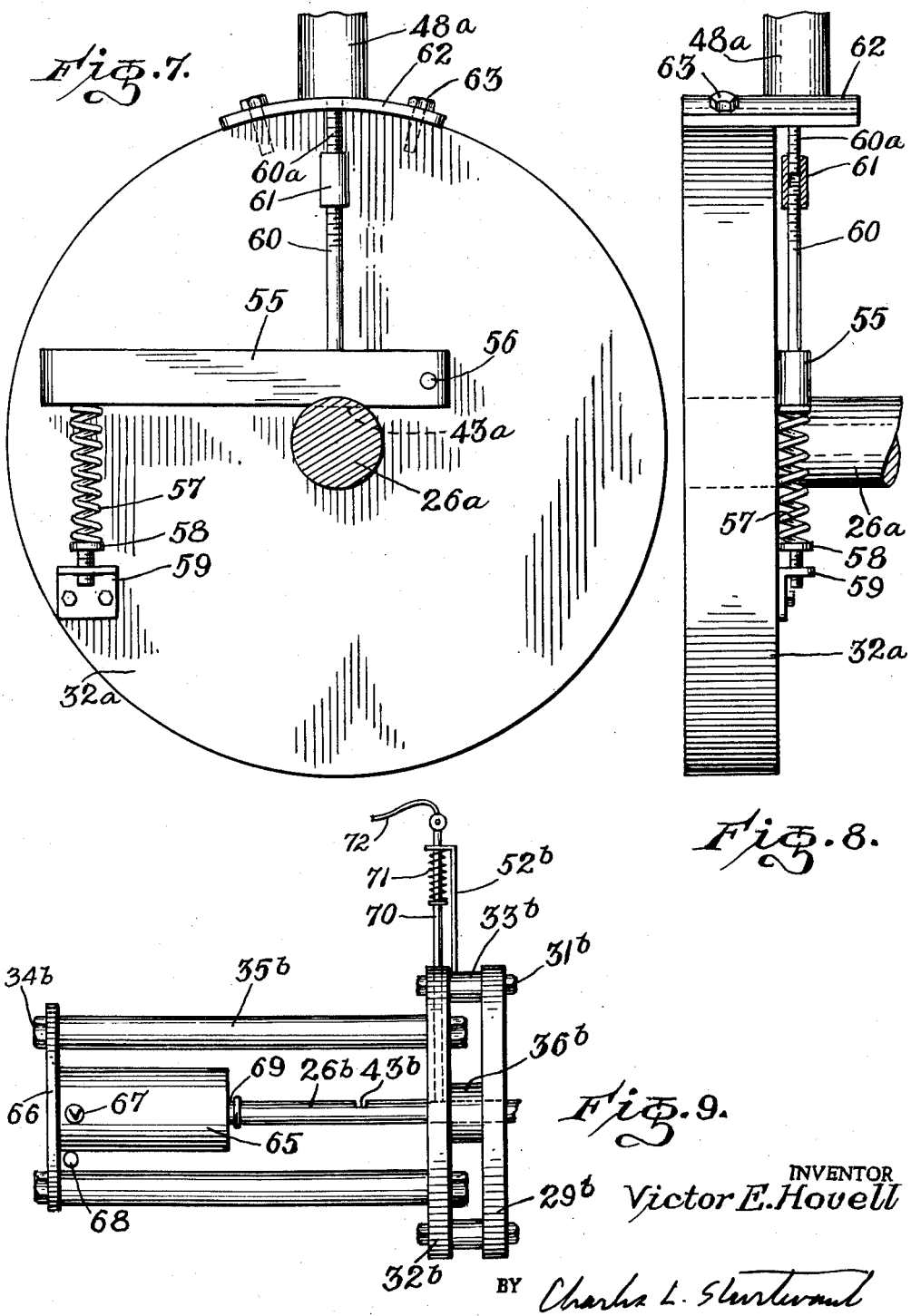

United States Patent Office 2,914,144
Patented Nov. 24, 1959

2,914,144

AUXILIARY SAFETY BRAKING SYSTEM

Victor Edward Hovell, Cranford, N.J.

Application November 30, 1955, Serial No. 549,989

12 Claims. (Cl. 188—106)

The present invention relates to new and useful improvements in vehicle braking systems, and more particularly to such improvements in an air brake system for trucks, tractors, trailers and the like.

Most heavy trucks and trailers are equipped with air brakes in which necessary pressure is built up and maintained in a storage tank by a compressor. Actuation of the brakes releases air under pressure into a brake diaphragm, which is operatively connected with the brake rods or the like, to set the brakes. There have been provided separate mechanical emergency brakes for use when the conventional air brakes fail, but such mechanical brakes have not proved entirely satisfactory by reason of their relatively small area of contact with the shaft brake drum, thus giving slow response or when under extreme stress insufficient brake effort to stop the vehicle. There have also been provided visual and audible signals to indicate to a truck driver when the air pressure in the system has fallen or approaches an unsafe level, but here again reliance must be on the human element, that is, the willingness of the driver to stop and check the cause of trouble.

Relatively heavy trucks and truck trailers have been involved in serious accidents resulting in loss of life and heavy property damage. Generally, these accidents resulting from an uncontrolled moving truck have been caused by the lack of sufficient air pressure in the system to apply the brakes with the truck moving or to maintain the brakes set if a truck is parked on a slope. Moreover, extensive and repeated operation of the conventional air brakes will often result in the pressure in the system being reduced to a level such that the brakes are not properly applied and the driver may lose control of the truck under such circumstances.

One of the principal objects of the present invention is to provide an auxiliary safety braking system which may be preloaded and latched in such preloaded condition and in operative association with the conventional braking system of a vehicle so that release of the latched and preloaded safety braking system will apply the conventional braking system in the event of failure of pressure in the conventional braking system or reduction of such pressure below a safe operating level.

Another object of the invention is to provide an auxiliary safety braking mechanism of the above type which may be manually preloaded, latched and released, or which may be automatically preloaded and latched by the braking pressure of the conventional system.

Another object of the invention is to provide an auxiliary safety braking mechanism substantially of the above type which may be positively locked in preloaded condition and released from such locked position in response to reduction of braking pressure in the conventional braking system below a predetermined level.

A further object of the invention is to provide an auxiliary safety braking mechanism substantially of the above type wherein the preloaded safety mechanism may be manually released or automatically released in response to reduction of braking pressure in the conventional braking system.

A still further object of the invention is to provide an auxiliary safety braking mechanism substantially of the above type wherein compression spring means is preloaded, either under the influence of the braking pressure of the conventional vehicle braking system or by jacking or the like, and latched in such preloaded condition from which it may be released manually or automatically.

The invention still further aims to provide an auxiliary safety braking mechanism substantially of the above type wherein a primary diaphragm chamber is in communication with the pressure of the vehicle braking system so as to effect compression of the braking spring means; and wherein a secondary diaphragm chamber, also in communication with the pressure of the vehicle braking system, operates to latch the spring means in preloaded condition so long as the pressure of the vehicle braking system remains at a safe operating level.

It is a further object of the invention to provide an auxiliary safety braking mechanism substantially of the type set forth above which is relatively simple in construction; which consists of a minimum number of parts; which is readily attachable to trucks and truck trailers equipped with conventional air brake systems and which may also be adapted for use with negative pressure systems, as well as with hydraulic brake operating systems.

The above and other objects of the invention will in part be obvious and will be hereinafter more fully pointed out.

In the accompanying drawings:

Fig. 1 is a fragmentary schematic view showing the auxiliary safety braking mechanism of the present invention applied to the conventional air brake system of a truck, trailer or tractor;

Fig. 2 is an enlarged side elevation showing one unit constituting an auxiliary safety braking mechanism unit for application to the brake system of a conventional truck, tractor or truck trailer;

Fig. 3 is a view similar to Fig. 2 but showing the auxiliary safety mechanism in preloaded condition;

Fig. 4 is a detail fragmentary view showing the brake rod connections between the conventional air brake system and the operating plunger of the auxiliary safety braking mechanism of this invention; the full line position of the brake actuating lever being the "off" position, and the dotted line position of the lever being the "on" position of the lever when actuated by the conventional brake system;

Fig. 5 is a view, similar to Fig. 4, but showing the brake actuating lever in the full line "off" position when actuated by the auxiliary brake mechanism and the dotted line position of the lever showing the normal "on" position;

Fig. 6 is a fragmentary view showing one form of adjustable connection between the brake actuating lever and the conventional and auxiliary brake systems;

Fig. 7 is a fragmentary end view showing a modified form of latching mechanism for holding the auxiliary braking mechanism in preloaded condition;

Fig. 8 is a side elevation of Fig. 7; and

Fig. 9 is a fragmentary side elevation, similar to Fig. 2, but with the spring means not shown, and showing a modified form of mechanism employing a jack for preloading the spring and a manual release for the latching mechanism.

Referring more in detail to the accompanying drawings and particularly to Fig. 1 at this time, the present invention is shown as applied to the rear end of a truck, tractor or trailer in relative position with respect to the conventional truck or trailer brake drums 10. The brake mechanism within the drums is operated through a conventional rotary shaft 11 in a bearing 12 having a link 14 at the inner end thereof and connected to a brake rod 16 which is in the form of a plunger connected to a diaphragm within the diaphragm housing 17. Each diaphragm housing 17 is connected to a compressed air storage tank 18 by the conduit 19 and branch conduits 20, 21, and the brakes are applied in conventional fashion by admitting the air under pressure to the diaphragm housings, as by pedal control of a valve 15, thus to shift the rods 16 to the left, as seen in Fig. 4, and this movement of the rods shifts the links 14 which actuate the brake elements through the shaft within the bearing 12 in conventional manner.

Mounted in general alignment with the brake rods 16 are the auxiliary safety braking devices of the present invention, these braking devices being generally indicated by the numerals 22 as shown in Fig. 1. The auxiliary braking device is shown in more detail and in brake applying position in Fig. 2, and the description of one of these devices will be sufficient as both or any additional number thereof are substantially identical.

The auxiliary braking mechanism includes a large diaphragm housing 23 which is in communication with the storage tank through the conduit 19 and a branch conduit 24. The diaphragm within the diaphragm housing 23 is connected as by a pin and clevis arrangement 25 with a reciprocating rod or piston 26, and the point of entry of this rod within the diaphragm housing is sealed by an expansible bellows 27. The area of the diaphragm within the diaphragm housing is such that with, for example, one hundred pounds per square inch as the normal pressure in the vehicle braking system, the diaphragm will exert an effort of about five thousand pounds on the rod 26.

At the right hand end of the auxiliary braking mechanism, as viewed in Fig. 2, there is provided a cylinder 28 with radially outwardly extending flanges 29, 30, threaded thereon and at opposite ends thereof. The flange 29 is secured by bolts 31 to a second flange 32 and there are provided spacer elements 33 on the bolts between these two flanges. The flange 32 is secured to the diaphragm housing 23 by bolts 34 having nuts thereon to confine elongated spacer sleeves 35 which, with the spacers 33, and the bolt connections, serve to definitely position and mount the flanges 29, 32 in predetermined position with respect to the diaphragm housing 23 and in a rigid assembly with the cylinder 28. The outer end of the rod 26 is connected to a head 36 movable through a complemental opening in the flange 29 and mounted for rectilinear movement within the cylinder 28. The head 36 is in turn connected to another rod 37 which projects outwardly from the opposite end of the cylinder 28 and through the flanges 39, 30a which are bolted together. The free end of the rod 37 has secured thereto a clevis member 38 in the arms of which are provided slots 39. A compression spring means 40 is disposed within the cylinder 28 between the head 36 and the flange 30a which serves as a seat therefor.

The end of the brake rod 16 is provided with a clevis 41 secured by a pin or the like to the rocking lever 14. A slack adjustment worm 42 may be provided for rotating the shaft 11 within the bearing sleeve 12. In normal operation of the conventional brake system, air is admitted to the diaphragm housing 17 to shift the rod 16 to the left, as seen in Fig. 4; and to the dotted line "on" position of the lever 14.

The rod 26 is provided with a locking slot 43 which is positioned thereon to be disposed in alignment with a slot 44 in the flange or plate 32 when the spring means 40 is compressed to the position substantially shown in Fig. 3. A plunger rod 45 is mounted for rectilinear movement in the slot 44 and is normally urged outwardly by a spring 46, the tension of which may be adjusted by the nut 47, or the like. The plunger rod 45 is engaged by a diaphragm rod 45a which extends within a small diaphragm housing 48 which is also in communication with the pressure system through the conduit 49. The diaphragm mechanism 48 is much smaller than the diaphragm mechanism 23 and is selected so that normal braking pressure of one hundred pounds per square inch in the system will depress the rod 45 so that its inner end will engage in the locking slot 43 as seen in Fig. 3. Thus, the spring means 40 is latched in preloaded condition by the rod 45 in engagement with the slot 43 and this latched condition is maintained while there is safe braking pressure in the system. The spring 46 may be adjusted so that the rod 45 will be elevated out of engagement with the locking slot 43 at a predetermined unsafe level of air pressure in the system. For instance, if the air pressure in the system drops below seventy pounds per square inch, the spring may be adjusted to then come into play and release the rod 45 from the slot 43 at which time the spring means 40 will be released to shift the rod 37 to the left in order to automatically apply the brakes through the connections which will be hereinafter described. It will be seen by reference to Fig. 2 that the diaphragm housing 48, plunger rod 45 and spring 46 are suitably mounted on a bracket 52 secured to the plate 33.

The clevis member 38 at the end of the rod 37 is connected to pins 50 on the rocking lever 14. When the spring means 40 is compressed and latched in the position of Fig. 3, the pins 50 are at the outer ends of the slots 39 in the full line position of Fig. 4. In this position, normal operation of the brakes through the conventional brake mechanism is permitted. Thus, the brake rod 16 can shift to the left to shift the rocking lever 14 to the brake applying position indicated by the dotted line position thereof. This movement is permitted by reason of the pins being free to slide in the slot 39 of the clevis 38.

Should the pressure in the system fall below a predetermined safe operating level, movement of the plunger rod 45 out of engagement with the slot 43 immediately permits the preloaded spring means 40 to become extended to the position of Fig. 2. This expanding movement of the spring means will shift the rod 37 inwardly and in doing so the pins 50, being at the outer ends of the slots 39, will be engaged by the closed ends of the clevis arms to shift the lever 14 to the "on" position which is the dotted line position shown in Fig. 5. It may be here pointed out, by way of example, that the usual throw of a conventional brake rod is about two inches. With a compression spring 40 having a length, for example, of twelve inches in extended position, the loaded length of the spring may approximate eight inches which will shift the rod 37 a similar distance leaving a two inch lost motion connection for normal operation of the conventional brake rod. If the spring, in preloaded condition, exerts an effort of about five thousand pounds on the head 36, upon release of the latching mechanism the rod 37 will travel the normal throw of two inches for applying the brakes by means of the safety auxiliary mechanism. Thus, the spring, when released, will exert an effort of about twenty-five hundred pounds on the brake operating lever 14, this being ample to effectively apply the vehicle brakes.

In Fig. 6 there is shown a modified form of connection between the brake operating rod 16a and the auxiliary brake operating rod 37a. There is here employed a single pin 53 projecting through aligned openings in the arms of the clevis 38a, the rocking lever 14 and the arms of the clevis 41a. Additional openings may be provided, as in the clevis arms 41a and the rocking lever 14 which may be shifted for slack adjustment to a position to receive the pin 53.

In Figs. 7 and 8, there is shown a modified form of latching device in which a lever 55 is pivoted, as at 56, to the flange member 32a through which the plunger 26a extends. This plunger 26a is provided with a transverse slot 43a, comparable to the recess 43 in the rod 26. A spring 57 bears against the lever 55 and normally tends to elevate the same out of engagement with the slot 43a. This spring 57 is connected to an adjusting screw 58 carried by a bracket 59 also mounted on the flange 32a.

A small diaphragm housing 48a, similar to the previously described diaphragm housing 48, has a diaphragm plunger 60a connected to a rod 60 by an adjustable connection 61. The free end of the rod 60 bears on the edge of the lever 55. The diaphragm housing 48a is mounted on a bracket 62 secured, as by bolts 63, to the flange 32a.

The operation of the form of latching device shown in Figs. 7 and 8 is similar to that previously described, it being understood that the end of the rod 26a is similarly secured to the head 36 for cooperation with the compression spring 40. When the pressure in the conventional braking system falls below a predetermined safe operating level, the force of the compressed spring 57 will operate to elevate the lever 55 and unlatch the same from its engagement with the rod 26a so that the compression spring 40 is released from its preloaded condition to automatically apply the brakes in the manner described heretofore.

In Fig. 9, there is shown a further modified form of the invention. In this form, the large and small diaphragm housings are omitted. Instead of preloading the compression spring 40 by the normal fluid pressure in the conventional braking system, there is provided a hydraulic jack 65 mounted on a flange 66 which is in turn connected to the flange 32b by bolts 34b and the included spacing sleeves 35b more or less in the manner previously described. With this form of the invention, there being a conventional valve 67 and operator 68 in the jack structure, the jack plunger 69 is forced to the right, as viewed in Fig. 9, to shift the rod 26b to a position compressing the spring means 40 with the slot 43b disposed in alignment with the rod 70 which is then urged by the relatively light spring 71 into engagement therewith. In this manner, the auxiliary braking device is preloaded by jacking and is spring latched in its preloaded condition.

The rod 70 is connected in suitable manner to a conventional push-pull flexible cable construction 72 leading, for instance, to the dashboard of the vehicle for ready access to the driver. Thus, when the driver's visual or audible signal indicated an unsafe operating pressure in the braking system, or if he finds that his brakes are not functioning properly, the driver may pull the readily accessible cable 72 which will elevate the rod 70 against the light load of the spring 71 to withdraw the end of the rod from the recess or slot 43b and then the compression spring means will be released to apply the vehicle brakes. Of course, it will be understood that any form of jacking mechanism may be employed and obviously, after the rod 26b is shifted to the position for preloading the spring means, the jack plunger 69 will be withdrawn in conventional manner.

From the foregoing description, it will be seen that the present invention provides a safety braking mechanism which is preloaded and latched in an inoperative position and which is releasable to operative brake applying position either manually or in response to a reduction of available pressure in the conventional brake system below a predetermined safe operating level. Release of the preloaded safety mechanism releases the energy stored in the housed spring means to shift the auxiliary safety brake rod to a position applying the vehicle brakes. In unusual circumstances where the braking pressure in the system might completely fail and drop suddenly to zero, the safety brake applying mechanism will be released and the brakes will be applied quickly. On the other hand, where there is a gradual loss of air pressure in the conventional system to a point below the predetermined safe level, the brakes will be applied but not as quickly in that the shifting of the auxiliary brake operating rod will be against the air pressure remaining in the system before the spring means is selected so that its stored energy will overcome the reacting remaining pressure in the system when the pressure therein falls below a safe operating level. Also, as where the brakes may have been applied to stop the truck, tractor or trailer, on a hill, the instant safety mechanism will operate even though the truck is unattended. Thus, should the air pressure in the system be reduced to a point where the brakes might be released, the preloaded spring means will be automatically released to set the brakes; or in instances where the vehicle is to be left unattended for some time, and on a slope, the safety mechanism may be released by the driver manually before leaving the vehicle unattended.

In certain forms of the invention, the spring means is preloaded and held in latched position by the normal air pressure in the conventional brake system. However, as in the form of the invention shown in Fig. 9, the spring means may be manually preloaded as by jacking and may be manually released by a manual shifting of the latching mechanism. It is to be clearly understood that the manual or automatic means may be used interchangeably with each form of the invention shown or a combination of manual and automatic means may be employed. For instance, the preloading of the spring may be by the braking pressure in the system, as in connection with the forms of the invention shown in Figs. 2 and 7, and there may be provided a manual release of the latching mechanism, such as suggested by the form of the invention shown in Fig. 9. On the other hand, the forms of the invention shown in Figs. 2 and 7 may also employ the jacking or other manual preloading of the spring means.

While certain forms of the invention have been shown and described for purposes of illustration, it is to be clearly understood that various changes in the details of construction and arrangement of parts may be made without departing from the spirit and scope of the invention as set forth in the appended claims.

I claim:

1. In a vehicle having wheels equipped with a brake operating lever connected to a diaphragm operator in a diaphragm housing communicating with a source of fluid under pressure in the brake system; the provision of an auxiliary safety brake applying mechanism comprising a pair of interconnected spaced and aligned mounting flange means, a spring mechanism mounted between said mounting flange means, an operating rod connected to the spring mechanism and projecting through one mounting flange means and connected with the brake operating lever, jacking mechanism supported from an opposite mounting flange means and operatively connected with said spring mechanism for preloading the same to shift its operating rod to an inoperative position with respect to the brake operating lever, latching means carried by the mounting flange means adjacent the jacking mechanism and cooperating with the operating rod to maintain the spring mechanism in preloading condition, and means for releasing said latching means whereby the spring mechanism will mechanically apply the brakes through the operating rod and the connection with the brake operating lever.

2. In a vehicle as claimed in claim 1, wherein one of the mounting flange means include a pair of closely spaced connected flanges between the jacking mechanism and the spring mechanism.

3. In a vehicle having wheels equipped with a brake operating lever connected to a diaphragm operator in a diaphragm housing communicating with a source of fluid under pressure in the brake system, the provision of an auxiliary safety brake applying mechanism comprising a frame structure including a pair of aligned and longitudinally spaced mounting flange means, a spring mechanism mounted between said flange means, a brake operating rod movable with said spring mechanism and connected with the brake operating lever, means including a spring loading rod extending axially of said flange means and projecting through one of said flange means for preloading said spring mechanism to shift its operating rod to an inoperative position with respect to the brake operating lever, latching means carried by the flange means through which said loading rod projects and interengageable with said spring loading rod to maintain the spring mechanism in preloaded condition, and means responsive to a reduction of fluid pressure in the system below a predetermined amount for releasing said latching means whereby the spring mechanism will mechanically apply the brakes through its operating rod and the connection with the brake operating lever.

4. In a vehicle as claimed in claim 3, wherein the latching means includes a reciprocable plunger adapted for cooperation with a notch in the operating rod for latching the spring means in preloaded condition.

5. In a vehicle as claimed in claim 3, wherein the flange means carrying said latching means includes a slot therethrough with a plunger mounted in said slot for rectilinear movement, and wherein the spring loading rod is notched to receive the end of said plunger to latch the spring mechanism in preloaded condition.

6. In a vehicle as claimed in claim 3, wherein the latching means includes a pivoted lever engageable with a recess in the operating rod for holding the spring mechanism in preloaded condition.

7. An auxiliary safety brake applying mechanism adapted for attachment to a wheeled vehicle having brakes and brake levers to be operated from a source of fluid under pressure in the brake system, and comprising mounting means by which the brake applying mechanism may be attached to the vehicle, said mounting means including a pair of interconnected spaced and aligned mounting flange means, a spring mechanism carried between said mounting flange means, jacking mechanism operable independently of the fluid pressure in the brake system and by which said spring mechanism may be compressed to a preloaded condition and said jacking mechanism being carried by one of said mounting flange means, latching means carried by the flange means mounting said jack mechanism and operable to hold the spring mechanism in preloaded condition, an operating member connected with said spring mechanism and having an operative connection with a brake lever, and means for releasing said latching means whereby the spring mechanism will then apply the vehicle brakes through the connection of its operating member with the brake lever.

8. An auxiliary safety brake applying mechanism as claimed in claim 7, wherein the means for releasing said latching means comprises a manual operator readily accessible to the driver of the vehicle.

9. An auxiliary brake applying mechanism as claimed in claim 7, wherein the latching means comprises a shiftable barlike member spring urged toward latching position.

10. An auxiliary brake applying mechanism as claimed in claim 7, wherein both the spring compressing mechanism and the latch releasing means are manually operable.

11. In a vehicle as claimed in claim 1, wherein the means for releasing the latching means comprises a manual operator readily accessible to the driver of the vehicle.

12. In a vehicle as claimed in claim 1, wherein the means for preloading the spring mechanism comprises a manually operable jack mechanism.

References Cited in the file of this patent

UNITED STATES PATENTS

| 691,022 | Tunnicliff | Jan. 14, 1902 |
| 1,792,895 | Cowlishaw | Feb. 17, 1931 |
| 2,409,908 | Simpkins | Oct. 22, 1946 |
| 2,670,817 | Tripp | Mar. 2, 1954 |
| 2,691,503 | Bigelow | Oct. 12, 1954 |

FOREIGN PATENTS

| 663,107 | Great Britain | Dec. 19, 1951 |